United States Patent
Bennett

(10) Patent No.: US 6,510,475 B1
(45) Date of Patent: Jan. 21, 2003

(54) DATA FETCHING CONTROL MECHANISM AND METHOD FOR FETCHING OPTIMIZED DATA FOR BUS DEVICES BEHIND HOST BRIDGE

(75) Inventor: Joseph A. Bennett, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/422,933

(22) Filed: Oct. 22, 1999

(51) Int. Cl.[7] .............................. G06F 3/00; G06F 3/02
(52) U.S. Cl. .............................. 710/60; 710/52; 710/56
(58) Field of Search .............................. 710/60, 52, 56

(56) References Cited

U.S. PATENT DOCUMENTS 5,768,548 A * 6/1998 Young et al. ............... 710/306
5,778,197 A * 7/1998 Dunham ..................... 710/104
5,838,995 A * 11/1998 Chen et al. .................. 710/60
5,872,998 A * 2/1999 Chee ........................... 710/56
5,884,027 A * 3/1999 Garbus et al. ............... 710/314

* cited by examiner

Primary Examiner—Peter Wong
Assistant Examiner—Tim Vo
(74) Attorney, Agent, or Firm—Antonelli, Terry, Stout & Kraus, LLP

(57) ABSTRACT

A data fetching control mechanism of a host chipset is disclosed for determining a fetch size to fetch data from a memory subsystem of a computer system. Such a data fetching control mechanism comprises input logics coupled to receive variables of a read command, a bus frequency, a bus data width from a bus device; and an index table which generates fetch values indicating fetch sizes of data to be fetched from a memory subsystem on one side of a host chipset, via a primary bus, for the bus device on the other side of the host chipset, via a secondary bus.

30 Claims, 3 Drawing Sheets

146

| PCI FREQUENCY | REQ64# | READ COMMAND | HARD DT REQUEST LENGTH | SOFT DT REQUESTS | |
|---|---|---|---|---|---|
| | | | | LINES REMAINING | REQUEST LENGTH |
| 33 | 1 | READ | 1 | 0 | 2 |
| 33 | 1 | LINE/MULTIPLE | 3 | 2 | 2 |
| 33 | 0 | READ | 1 | 0 | 2 |
| 33 | 0 | LINE/MULTIPLE | 6 | 4 | 4 |
| 66 | 1 | READ | 1 | 0 | 2 |
| 66 | 1 | LINE/MULTIPLE | 6 | 4 | 4 |
| 66 | 0 | READ | 1 | 0 | 2 |
| 66 | 0 | LINE/MULTIPLE | 8 | 7 | 8 |

FIG. 3
146

| PCI FREQUENCY | REQ64# | READ COMMAND | HARD DT REQUEST LENGTH | SOFT DT REQUESTS LINES REMAINING | SOFT DT REQUESTS REQUEST LENGTH |
|---|---|---|---|---|---|
| 33 | 1 | READ | 1 | 0 | 2 |
| 33 | 1 | LINE/MULTIPLE | 3 | 2 | 2 |
| 33 | 0 | READ | 1 | 0 | 2 |
| 33 | 0 | LINE/MULTIPLE | 6 | 4 | 4 |
| 66 | 1 | READ | 1 | 0 | 2 |
| 66 | 1 | LINE/MULTIPLE | 6 | 4 | 4 |
| 66 | 0 | READ | 1 | 0 | 2 |
| 66 | 0 | LINE/MULTIPLE | 8 | 7 | 8 |

FIG. 4
146

| CACHE LINE SIZE | PCI FREQUENCY | REQ64# | READ COMMAND | HARD DT REQUEST LENGTH | SOFT DT REQUESTS LINES REMAINING | SOFT DT REQUESTS REQUEST LENGTH |
|---|---|---|---|---|---|---|
| 64 | 33 | 1 | READ | 2 | 0 | 2 |
| 64 | 33 | 1 | LINE/MULTIPLE | 4 | 2 | 2 |
| 64 | 33 | 0 | READ | 2 | 0 | 2 |
| 64 | 33 | 0 | LINE/MULTIPLE | 6 | 4 | 4 |
| 64 | 66 | 1 | READ | 2 | 0 | 2 |
| 64 | 66 | 1 | LINE/MULTIPLE | 6 | 4 | 4 |
| 64 | 66 | 0 | READ | 2 | 0 | 2 |
| 64 | 66 | 0 | LINE/MULTIPLE | 8 | 8 | 8 |

DATA FETCHING CONTROL MECHANISM AND METHOD FOR FETCHING OPTIMIZED DATA FOR BUS DEVICES BEHIND HOST BRIDGE

TECHNICAL FIELD

The present invention relates to data fetching, and more particularly, relates to a data fetch control mechanism and method of fetching optimized data from a memory subsystem on one side of a host bridge such as a PCI—PCI bridge for bus devices such as Peripheral Component Interconnect (PCI) devices on the other side of the host bridge.

BACKGROUND

Historically, computer systems have utilized one or more buses as an interconnect transportation mechanism to transfer data between different internal components, such as one or more processors, memory subsystems and input/output (I/O) devices including, for example, keyboards, input mouses, disk controllers, serial and parallel ports to printers, scanners, and display devices. For computer systems using processors such as the 8088, 8086, 80186, i386™ and 486™ microprocessors designed and manufactured by Intel Corporation, such buses have typically been designed as either an Industry Standard Architecture (ISA) bus or an Expanded Industry Standard Architecture (EISA) bus. The ISA bus is a sixteen (16) bit data bus while the EISA bus is thirty-two (32) bits wide. Each of these buses functions at a frequency of eight (8) megahertz. However, the data transfer rates provided by these bus widths and operational frequencies have been limited.

For recent computer systems, such as servers, workstations or personal computers (PCs) using a "Pentium®" family of microprocessors (manufactured by Intel Corporation), for example, such buses may be Peripheral Component Interconnect (PCI) buses. The PCI buses are high performance 32 or 64 bit synchronous buses with automatic configurability and multiplexed address, control and data lines as described in the latest version of "PCI Local Bus Specification, Revision 2.2" set forth by the PCI Special Interest Group (SIG) on Dec. 18, 1998. Currently, the PCI architecture provides the most common method used to extend computer systems for add-on arrangements (e.g., expansion cards) with new video, networking, or disk memory storage capabilities.

When PCI buses are used as an interconnect transportation mechanism in a host system (e.g., server, workstation or PC), data transfer between a processor, a memory subsystem and I/O devices may be executed at high speed. Bridges may be provided to interface and buffer transfers of data between the processor, the memory subsystem, the I/O devices and the PCI buses. Examples of such bridges may include PCI-PCI bridges as described in detail in the *"PCI-PCI Bridge Architecture Specification, Revision* 1.1" set forth by the PCI Special Interest Group (SIG) on Apr. 5, 1995. However, the performance of such a host system may be burdened by a significant amount of time required to process read requests from PCI devices (e.g., I/O devices that conform to the PCI Local Bus Specification for operation) to access memory locations of the memory subsystem, via the PCI buses, during data memory read operations. Existing data fetching schemes for PCI devices, however, fail to optimize the PCI bus operation. Typically, data fetched from the memory subsystem are at a standard size, and may not be optimized at various fetch sizes for PCI devices behind or on one side of a host bridge such as a PCI-PCI bridge based upon a particular request. As a result, the memory read operations may not be maximized, and the wait time between memory read operations may be unnecessarily lengthened.

Accordingly, there is a need for an efficient data fetching control mechanism which fetches optimized data from a memory subsystem on one side of a host bridge such as PCI-PCI bridge for PCI devices on the other side of the host bridge in accordance with characteristics of a particular request, such as a command type, a data width, a clock frequency and a cache line size.

SUMMARY

Accordingly, various embodiments of the present invention are directed to a data fetching control mechanism and a method for determining a fetch size to fetch data from a memory subsystem of a computer system. Such a mechanism may comprise input logics coupled to receive variables of a read command, a bus frequency, and a bus data width from a bus device; and an index table which generates fetch values indicating fetch sizes of data to be fetched from a memory subsystem on one side of a host chipset, via a primary bus, for the bus device on an opposite side of the host chipset, via a secondary bus.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein:

FIG. 3 illustrates one embodiment of an example look-up table implementation of an example data fetching control mechanism as shown in FIG. 2;

FIG. 4 illustrates an alternative embodiment of an example look-up table implementation of an example data fetching control mechanism as shown in FIG. 2.

DETAILED DESCRIPTION

The present invention is applicable for use with all types of system and peripheral buses, bridges and chipsets, including chipsets with PCI 64-bit hubs (P64H) and P64H follow-on products, and new chipsets having internal buffers and data fetching control logics incorporated therein and new computer platforms which may become available as computer technology develops in the future. However, for the sake of simplicity, discussions will concentrate mainly on exemplary use of a PCI bus and a PCI-PCI bridge, although the scope of the present invention is not limited thereto.

Figure 1:
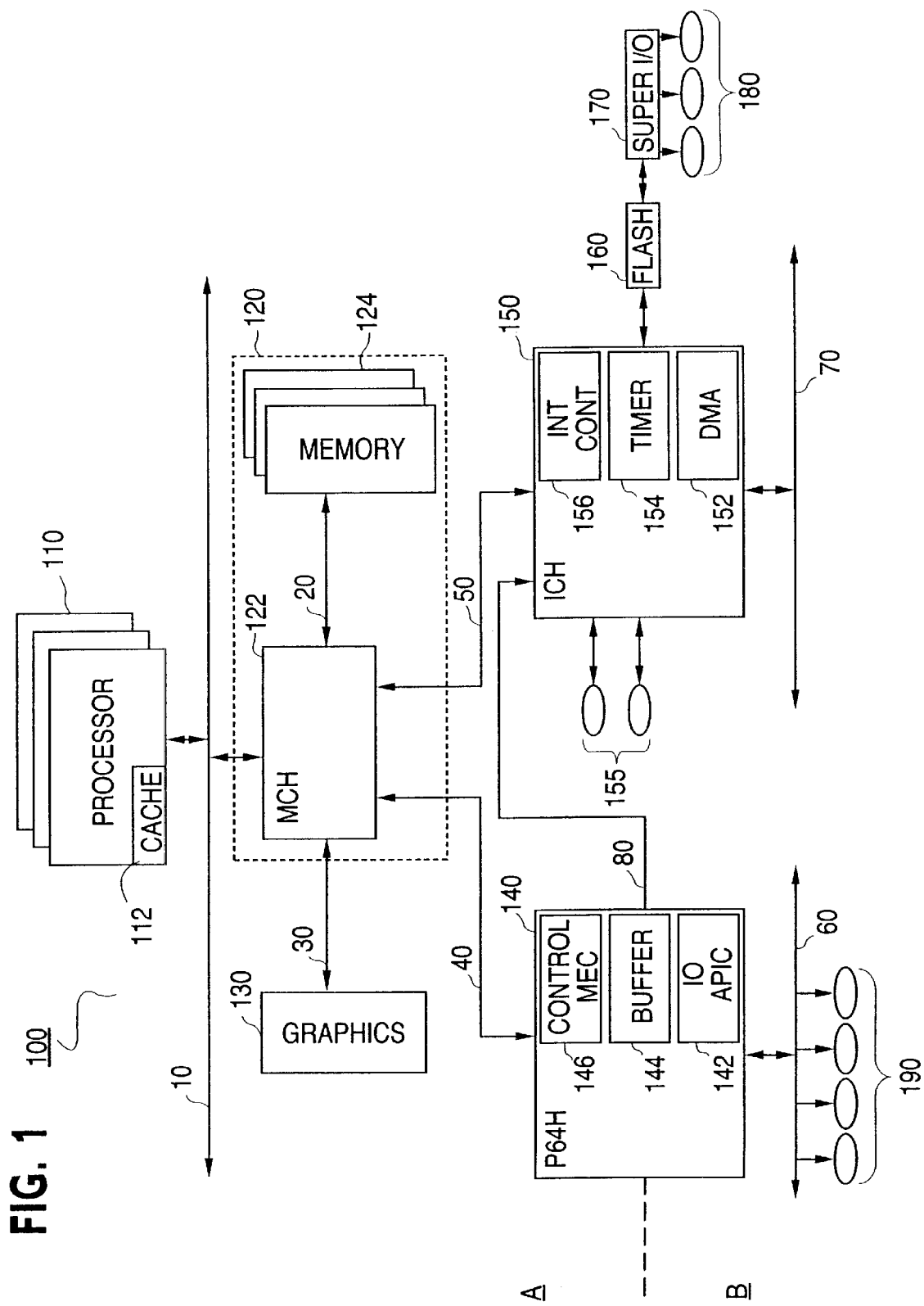
FIG. 1 illustrates one embodiment of an example computer system platform having an example data fetching control mechanism incorporated therein according to the principles of the present invention.

Attention now is directed to the drawings and particularly to FIG. 1, an example computer system platform having an example data fetching control mechanism incorporated therein according to the principles of the present invention is illustrated. As shown in FIG. 1, the computer system 100 may comprise a processor subsystem 110, a memory subsystem 120, connected to the processor subsystem 110 by a front side bus 10, graphics 130 connected to the memory subsystem 120 by a AGP or graphics bus 30, one or more host chipsets 140–150 connected to the memory subsystem 120 by hub links 40 and 50 for providing an interface with peripheral buses such as Peripheral Component Interconnect (PCI) buses 60 and 70 of different bandwidths and operating speeds, a flash memory 160, and a super I/O 170 connected to the chipset 150 by a low pin count (LPC) bus for providing an interface with a plurality of I/O devices 180, including, for example, a keyboard controller for controlling operations of an alphanumeric keyboard, a cursor control device such as a mouse, track ball, touch pad, joystick, etc., a mass storage device such as magnetic tapes, hard disk drives (HDD), and floppy disk drives (FDD), and serial and parallel ports to printers, scanners, and display devices. A different plurality of I/O devices 190 may be provided by the non-legacy PCI bus 60. In addition, it may be noted that the computer system 100 may be configured differently or employ some or different components than those shown in FIG. 1.

The processor subsystem 110 may include a plurality of host processors 110a–110n and a cache subsystem 112. The memory subsystem 120 may include a memory controller hub (MCH) 122 connected to the host processors 110a–110n by a front side bus 10 (i.e., host or processor bus) and at least one memory element 124 connected to the MCH 122 by a memory bus 20. The memory element 124 may preferably be a dynamic random-access-memory (DRAM), but may be substituted for read-only-memory (ROM), video random-access-memory (VRAM) and the like. The memory element 124 stores information and instructions for use by the host processors 110a–110n. The graphics 130 may be connected to the main controller hub 122 of the memory subsystem 120 by an AGP bus (graphics bus) 30, and may include, for example, a graphics controller, a local memory and a display device (e.g., cathode ray tube, liquid crystal display, flat panel display, etc.).

The host chipsets 140 and 150 may be Peripheral Component Interconnect (PCI) bridges (e.g., host, PCI-PCI, or standard expansion bridges) in form of PCI chips such as, for example, the PIIX4® chip and PIIX6® chip manufactured by Intel Corporation. In particular, the chipsets 140 and 150 may correspond to a Peripheral Component Interconnect (PCI) 64-bit hub (P64H) 140 and an input/output controller hub (ICH) 150. The P64H 140 and the ICH 150 may be connected to the MCH 122 of the memory subsystem 120 respectively by 16 bits and 8 bits hub links 40 and 50, for example, and may operate as an interface between the front side bus 10 and peripheral buses 60 and 70 such as PCI buses of different bandwidths and operating speeds. The PCI buses may be high performance 32 or 64 bit synchronous buses with automatic configurability and multiplexed address, control and data lines as described in the latest version of "PCI Local Bus Specification, Revision 2.2" set forth by the PCI Special Interest Group (SIG) on Dec. 18, 1998 for add-on arrangements (e.g., expansion cards) with new video, networking, or disk memory storage capabilities. For example, the PCI bus 60 of 64-bits and 66 MHz may connect to the P64H 140. Similarly, the PCI bus 70 of 32-bits and 33 MHz may connect to the ICH 150. Other types of bus architecture such as Industry Standard Architecture (ISA) and Expanded Industry Standard Architecture (EISA) buses may also be utilized.

In a preferred embodiment of the present invention, the hub links 40 and 50 which connect the P64H 140 and the ICH 150 to the MCH 122 of the memory subsystem 120 may be primary PCI buses of different bandwidths and operating speeds. The peripheral buses 60 and 70 which connect the P64H 140 and the ICH 150 to I/O devices may be secondary PCI buses different bandwidths and operating speeds. The P64H 140 and ICH 150 may correspond to PCI-PCI bridges designed for compliance with the "PCI Local Bus Specification, Revision 2.2" set forth by the PCI Special Interest Group (SIG) on Dec. 18, 1998, and the "PCI Bus Power Interface (ACPI) and Power Management Interface Specification, Revision 1.1" set forth by the PCI Special Interest Group (SIG) on Jun. 30, 1997.

P64H 140 may include an IO APIC 142 of an APIC system such as an Intel 82489DX APIC described in the "MultiProcessor Specification (MPS)" Version 1.1., Sep. 1994, Intel Corp., internal buffers 144 and a data fetching control mechanism 146 constructed according to the principles of the present invention for controlling data transfers among the processors 110a–110n, the main memory 124 of the memory subsystem 120 and the PCI bus 60, including fetching data from main memory 124 of the memory subsystem 120 in response to requests from PCI devices 190 (i.e., I/O devices connected to the PCI bus) via the PCI bus 60. The P64H 140 may also include circuitry for interfacing the processor 110 and the main memory 124, and circuitry for interfacing to the PCI bus 60.

The internal buffers 144 may be provided to store data transfers among the processors 110a–110n, the main memory 124 of the memory subsystem 120 and the PCI bus 60 so that the transfers of data in either direction may be accelerated to enhance the speed of data transfer in the computer system. In particular, the internal buffers 144 may include a memory buffer (not shown) for holding data from a memory subsystem 120 on one side (side A) of the P64H 140 for a particular PCI device 190 on the other side (side B) of the P64H 140, and a command buffer (not shown) for holding commands from PCI devices 190 on side B of the P64H 140 destined for a memory subsystem 120 on side A of the P64H 140.

The data fetching control mechanism 146 may be integrated within the P64H 140 rather than provided as a separate chip within a host chipset for simplicity. Connected to the PCI bus 60 may be a group of PCI devices (I/O devices) 190, including, for example, multiple high performance peripherals in addition to graphics (motion video, LAN, SCSI, FDDI, hard disk drives, etc.). Also connected to the PCI bus 60 may be additional secondary bridges for providing data transfers between the PCI bus 60 and a secondary bus so that the data may be used by various component circuits joined to the secondary bus. The secondary bus may be an ISA bus, an EISA bus, or a similar bus, any of which typically transfers data at a rate slower than the PCI bus 60. Examples of secondary bridges may include those described in detail in a publication entitled "82420/82430 PCIset, ISA and EISA Bridges," in 1993, Intel Corporation.

ICH 150 may include a direct memory access (DMA) controller 152, a timer 154, an interrupt controller 156 such as an Intel 8259 PIC, universal serial bus (USB) ports and IDE ports for providing an interface to a hard disk drive (HDD) and compact disk read-only-memory (CD-ROM). In addition, the P64H 140 may optionally include an IO Advanced Programmable Interrupt Controller (APIC) of an APIC system for handling additional interrupts from a PCI bus 70, if additional interrupts are required.

The flash memory (e.g., EPROM) 160 and the super I/O 170 may be connected to the ICH 150 via a low pin count (LDC) bus. The flash memory 160 may store a set of system basic input/output start up (BIOS) routines at startup of the computer system 100. The super I/O 170 may provide an interface with a group of I/O devices 180, including, for example, a keyboard controller for controlling operations of an alphanumeric keyboard, a cursor control device such as a mouse, track ball, touch pad, joystick, etc., a mass storage device such as magnetic tapes, hard disk drives (HDD), floppy disk drives (FDD), and serial and parallel ports to printers, scanners, and display devices.

As described with reference to FIG. 1, existing data fetching schemes may be utilized to fetch data from main memory 120 of the memory subsystem 120 on one side (side A) of the P64H 140 in response to requests from PCI devices 190, via the PCI bus 60, on the other side (side B) of the P64H 140. However, such data fetched from the memory subsystem 120 are at a standard fetch size and may not be optimized for PCI devices 190 on one side of the P64H 140 in accordance with different fetch sizes requested. As a result, the memory read operations may not be maximized, and the wait time between memory read operations may not be minimized. In many cases, simple fetch algorithm may be utilized in advanced chipsets such as, for example, 440BX host bridge chipsets manufactured by Intel Corporation to enhance the memory efficiency. For instance, when a command is a PCI "memory read" command or "memory read line" command, a line of data is fetched. When a command is a PCI "memory read multiple", multiple lines of data are fetched. However, the amount of data transfers between the PCI devices 190 on one side of the P64H 140 and the main memory 124 of the memory subsystem 120 as shown in FIG. 1 may still require optimization.

Accordingly, the present invention advantageously provides an efficient and cost-effective data fetching control mechanism 146 implemented to fetch (or pre-fetch) optimized data from a main memory 124 of the memory subsystem 120 on one side (side A) of a host bridge such as a P64H 140 for PCI devices 190 on the other side of the P64H 140 in accordance with a particular request, such as a command type, a bus data width, a bus frequency and a cache line size. The PCI bus command type may be a 4-bit command (such as, for example: "0110", "1110" and "1100" ) which indicates either a "memory read" command, a "memory read line" command, and a "memory read multiple" command as specified by the "*PCI Local Bus Specification, Revision 2.2.*" For example, the "memory read" command may be used to read or fetch a single Dword of 32-bit block of data. The "memory read line" command may be used to read or fetch more than a Dword of 32-bit block of data up to the next cache line (a complete cache line). The "memory read multiple" command may be used to read or fetch more than one cache line before disconnecting.

In addition to the command type, the bus frequency, the bus data width and cache line size may be utilized to determine variable fetch sizes in order to fetch optimized data from main memory 124 of the memory subsystem 120 for PCI devices 190 on one side of the P64H 140. The bus frequency may indicate either 33 MHz or 66 MHz, based upon M66EN (66 MHz__ENABLE) used as an input. The bus frequency may run at 33 to 66 MHz if M66EN is asserted, and 0 to 33 MHz if M66EN is de-asserted. In other words, the M66EN may be used to indicate to the current PCI device (bus master) 190 whether a PCI bus 60 is operating at either 33 MHz or 66 MHz. The bus data width may indicate either 32 bits or 64 bits, based upon REQ64# assertion by the PCI device 190. The REQ64# may correspond to a 64-bit request. In other words, the data transfer may be at 64 bits if REQ64# is asserted by the current PCI device 190, and may be 32 bits if REQ64# is de-asserted by the current PCI device 190. Lastly, the cache line size may be either 32 bytes or 64 bytes, based upon an internal register in a host bridge such as P64H 140. The length of a cache line may be defined by the Cacheline Size register in Configuration Space which is initialized by configuration software of the host bridge.

The data fetching control mechanism 146 according to the principles of the present invention may be integrated within the P64H 140 rather than having a separate chip formed as portion of the P64H 140. Such a data fetching control mechanism 146 may be implemented by a cloud of logic which receives input variables such as the command type (memory read, memory read line, and memory read multiple), REQ#64, M66EN, and optional cache line size, and an index table which generates corresponding index or fetch values indicating a fetch size for fetching data from main memory 124 of the memory subsystem 120 on one side (side A) of the P64H 140 for PCI devices 190 on the other side (side B) of the P64H 140, based upon the command type, the bus frequency, and the bus data width as will be described with reference to FIGS. 2 and 3, and alternatively, based upon the command type, the bus frequency, the bus data width and cache line size as will be described with reference to FIGS. 2 and 4 hereinbelow.

Figure 2:
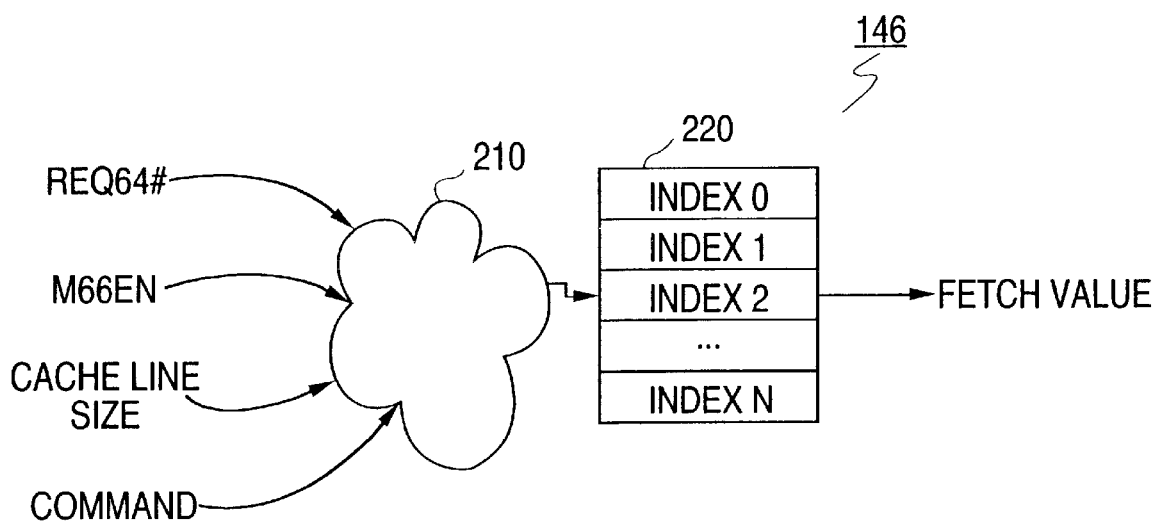
FIG. 2 illustrates one embodiment of an example data fetching control mechanism for fetching optimized data for PCI devices behind a host bridge such as a PCI-PCI bridge for a particular request according to the principles of the present invention.

Refer now to FIG. 2, a block diagram of an example data fetching control mechanism 146 for fetching optimized data for PCI devices 190 behind a host bridge such as a P64H 140 for a particular request according to the principles of the present invention is illustrated. As shown in FIG. 2, the data fetching control mechanism 146 may comprise a cloud (array) of logic 210 which receives input variables such as the command type (memory read, memory read line, and memory read multiple), REQ#64 and M66EN signals, and also optional cache line size, and an index table 220 which generates corresponding index or fetch values indicating a fetch size of data to be fetched from main memory 124 of the memory subsystem 120 on side A of the P64H 140 for a requesting PCI device 190 on side B of the P64H 140.

In a preferred embodiment of the present invention, the cloud of logic 210 which receives input variables of the command type (memory read, memory read line, and memory read multiple), REQ#64, M66EN (PCI frequency) and cache line size, and the index table 222 which generates output fetch values may be implemented by a programmable logic array (PLA) or a look-up table as shown in FIGS. 3 and 4. In particular, FIG. 3 illustrates one example look-up table implementation without reference to the cache line size of an example data fetching control mechanism shown in FIG. 2. Likewise, FIG. 4 illustrates another example look-up table implementation with reference to the cache line size of an example data fetching control mechanism shown in FIG. 2. The fetch values provided from the look-up table may be based upon latency calculations of the computer system platform. The fetch values provided may be specific to the computer system platform described with reference to FIG. 1. Accordingly, these fetch values provided may be varied with different computer system platforms, and may not be narrowly confined by those exemplary values described hereinbelow.

As shown in FIG. 3, the example look-up table 146 may be an array of 6 columns by 8 rows, and may include permutations of input variables of the bus frequency (33 MHz or 66 MHz), REQ64# (bus data width of either 32 bits when de-asserted or 64 bits when asserted), and the read command type (memory read, memory read line, and memory read multiple) in the first three columns, and corresponding fetch values for hard delayed transaction (DT) and soft delayed transaction (DT) requests in the last three columns. In this example embodiment, the Cacheline Size register is not implemented. As a result, the PCI device 190 on the PCI bus 60 may assume that a cache line size of 32 bytes and use the read commands as described. A hard delayed transaction (DT) is an initial transaction when a read request is received from a PCI device 190, and starts when a read cycle is absorbed by the P64H 140. The request data length indicates the number of 32-bytes lines that the P64H 140 may request on the primary PCI bus (i.e., hublink 40) as a result of the input variables such as the bus frequency, REQ64# and the command type. A soft delayed transaction (DT) is an algorithm which pre-fetches additional lines of data in case where additional data is requested. The lines remaining indicates the number of lines must be left before additional lines may be requested from the P64H 140.

For example, if input bus frequency is 33 MHz, REQ64# is asserted as an active high (1), and the command type is a read command as shown in row #1, an output request data length of hard DT may be one (1) which is a 32 bytes line. The lines remaining for soft DT may be zero (0) and the request length for soft DT may be two (2) lines which are additional 64 bytes. The output request data lengths of hard DT and soft DT which indicate the fetch values for fetching data from a memory subsystem 120 on one side (side A) of the P64H 140 for a requesting PCI device 190 on the other side (side B) of the P64H 140 may be the same for each read command as indicated on row #1, row #3, row #5 and row #7, regardless of whether the bus frequency is 33 MHz or 66 MHz, or whether the REQ64# is asserted as active high (1) or is de-asserted as active low (0).

If input bus frequency is 33 MHz, REQ64# is asserted as active high (1), and the command type is a read line/multiple command as shown in row #2, an output request data length of hard DT may be three (3) lines. The lines remaining for soft DT may be two (2) and the request length for soft DT may be two (2) lines which are additional 64 bytes. If REQ64# is de-asserted as active low (0) as shown in row #4, and likewise, if the bus frequency is double at 66 MHz but REQ64# is asserted as active high (1) as shown in row #6, output request data lengths of hard DT and soft DT may be double from row #2 (for example, at 6, 4 and 4). Lastly, if the bus frequency is double at 66 MHz and REQ64# is de-asserted as active low (0) as shown in row #8, output request data lengths of hard DT and soft DT may be double again (for example, at 12, 8 and 8). However, the maximum data length supported by the P64H 140 may only be eight (8) lines due to gate count and buffer space limitations of platform architecture. As a result, the request length for hard DT may be eight (8). Similarly, the lines remaining for soft DT may be seven (7) and the request length for soft DT may be eight (8) lines.

FIG. 4 illustrates an alternative example look-up table implementation of an example data fetching control mechanism 146 as shown in FIG. 2. As shown in FIG. 4, the example look-up table 146 may include permutations of input variables of the cache line size of 64 bytes, bus frequency (33 MHz or 66 MHz), REQ64# (bus data width of either 32 bits when de-asserted or 64 bits when asserted), and the read command type (memory, memory read line, and memory read multiple) in the first four columns, and corresponding fetch values for hard delayed transaction (DT) and soft delayed transaction (DT) requests in the last three columns. In this alternative embodiment, the Cacheline Size register is implemented. As a result, the cache line size is a 64 bytes line. All odd data line outputs for hard DT and soft DT requests may turn into next even line numbers in order to avoid multiple snoop phenomenon. This is important since odd data line requests may cause multiple snoops during the same read cycle.

For example, if input bus frequency is 33 MHz, REQ64# is asserted as an active high (1), and the command type is a read command as shown in row #1, an output request data length of hard DT may turn into two (2) lines from one (1) line as described with reference to FIG. 3. The lines remaining for soft DT may remain at zero (0) and the request length for soft DT may remain at two (2) lines which are additional 64 bytes. Again, the output request data lengths of hard DT and soft DT which indicate the fetch values for fetching data from a memory subsystem 120 on one side (side A) of the P64H 140 for a requesting PCI device 190 on the other side (side B) of the P64H 140 may be the same for each read command as indicated on row #1, row #3, row #5 and row #7, regardless of whether the bus frequency is 33 MHz or 66 MHz, or whether the REQ64# is de-asserted as active low (0) or asserted as active high (1).

If input bus frequency is 33 MHz, REQ64# is asserted as active high (1), and the command type is a read line/multiple command as shown in row #2, an output request data length of hard DT may turn into four (4) lines from three (3) lines as described with reference to FIG. 3.

The lines remaining for soft DT may remain at two (2) and the request length for soft DT may remain at two (2) lines which are additional 64 bytes. If the bus frequency is double at 66 MHz and REQ64# is asserted as active low (0) as shown in row #8, the lines remaining for soft DT may turn into eight (8). However, the request length for hard DT and soft DT may remain at eight (8) lines due to gate count and buffer space limitations of platform architecture.

Figure 5:
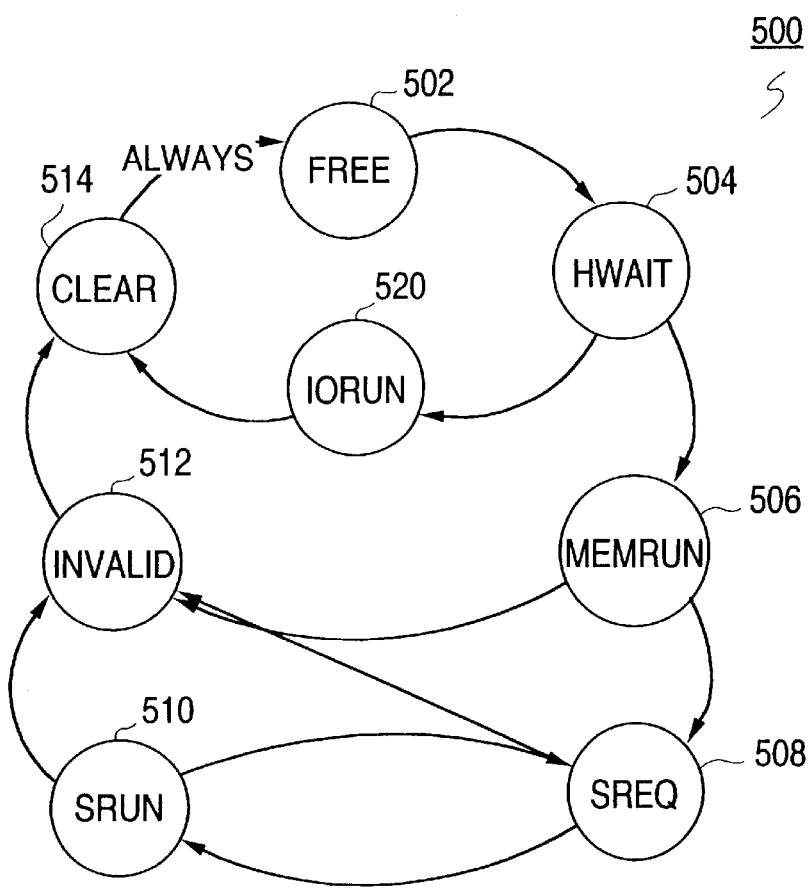
FIG. 5 illustrates a diagram of operating states of a state machine utilized to implement one embodiment of the present invention.

FIG. 5 illustrates a diagram of operating states of an algorithmic state machine 500 utilized to implement optimized data fetching from a memory subsystem on one side of the P64H 140 for a requesting PCI device 190 on the other side of the P64H 140 of a data fetching control mechanism 146 according to the principles of the present invention. The following description as well as the state machine diagrams of FIG. 5 make specific reference to signals generated by or associated with Intel microprocessors. It is noted, however, that the present invention may be implemented in conjunction with other microprocessors and/or other specific control signals.

Upon reset of the computer system 100, state machine 500 assumes an initial state labeled FREE state 502. The state machine 500 remains idle and is free to receive new delayed transaction (DT) cycle. During FREE state 502, state machine 500 monitors the loading of a hard delayed transaction (DT) and moves to HWAIT state 504, when a hard DT has been loaded. During HWAIT state 504, state machine 500 launches a hard DT request on the primary PCI bus as a result of input variables as shown, for example, in FIGS. 3 and 4, in order to obtain the output request data length for hard DT shown, for example, in first output column of FIGS. 3 and 4. After the output request data length for hard DT is obtained, state machine 500 transitions from HWAIT state 504 to MEMRUN state 506 to allow a requesting PCI device 190 (PCI master) to retrieve data fetched from the memory subsystem 120. When the number of cache lines has fallen below the lines remaining watermark shown in second output column of FIGS. 3 and 4, state machine 500 transitions from MEMRUN state 506 to SREG state 508 to issue a soft DT request in order to obtain the output request data length for soft DT shown, for example, in last output column of FIGS. 3 and 4.

After the output request data length for soft DT is obtained, state machine 500 transitions from SREG state 508 to SRUN state 510 to allow the requesting PCI device 190 (PCI master) to retrieve data fetched from the memory subsystem 120. The state machine 500 may transition from SRUN state 510 back to SREG state 508 any time the number of cache lines has fallen below the lines remaining watermark shown in second output column of FIGS. 3 and 4. However, whether the state machine 500 is in either MEMRUN state 506, SREG state 508 or SRUN state 510, hard or soft delayed transaction (DT) may be terminated because certain invalidation conditions have occurred. For example, state machine 500 may transition from MEMRUN state 506 to INVALID state 512 if hard DT entry has become invalid for one of the following reasons: (1) the requesting PCI device 190 (PCI master) has terminated the DT; (2) hard DT timer has expired; or (3) all DT data has been retrieved which may prevent issuance of soft DT requests. Similarly, state machine 500 may transition from either SREG state 508 or SRUN state 510 to INVALID state 512 if soft DT entry has become invalid for one of the following reasons: (1) the requesting PCI device 190 (PCI master) has terminated the DT; (2) soft DT timer has expired; (3) the snoop hit from the requesting PCI device 190 (PCI master) writes to the same 4KB page boundary; (4) there was a downstream request before the request was able to be issued upstream; or (5) all DT data has been retrieved which may prevent issuance of soft DT requests.

During INVALID state 512, all DT entries are now invalid. Data that is pre-fetched from the memory subsystem 120 and stored in internal buffers 144 of the P64H 140 must be cleared for entry of another DT. Accordingly, state machine 500 transitions from INVALID state 512 to CLEAR state 515 to clear all entry registers and data queue prior to freeing the entry of another DT at FREE state 502.

For special cases which relate to non-memory type of transactions, state machine 500 transitions from HWAIT state 504 directly to IORUN state 520 to allow the requesting PCI device 190 (PCI master) to retrieve data fetched from the memory subsystem 120. The state machine 500 transitions from HWAIT state 504 to IORUN state 520, when I/O read data has returned, the I/O write completion packet has returned or a non-prefetchable memory read initiated by the PCI device 190 has completed. After the I/O transaction has completed or the hard DT timer has expired, state machine 500 moves to CLEAR state 514 to clear all the entry registers and data queue prior to freeing the entry for another DT.

As described from the foregoing, the present invention advantageously provides a data fetching control mechanism and algorithm implemented to effectively fetch optimized data from a memory subsystem on one side of a host bridge for a PCI device on the other side of such a host bridge in such a manner as to obtain high performance to the PCI device and higher system performance.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the computer system as shown in FIG. 1 may be configured differently or employ some or different components than those illustrated. In addition, the data fetching control mechanism shown in FIGS. 2–4 may be configured differently or employ some or different components than those illustrated without changing the basic function of the invention. For instance, different combinations of logic gates may be used to correspond input variables such as the command type (memory read, memory read line, and memory read multiple), REQ#64 and M66EN signals, and also optional cache line size with output fetch values for fetching data from a memory subsystem on one side of a host bridge to a designated PCI device on the other side of the host bridge. Additionally, alternative bus widths and frequencies may be used as both bus widths and bus frequencies tend to increase as technology advances. Further, software equivalents to the data fetch control mechanism as shown in FIGS. 2–4 may be available to fetch data from a memory subsystem on one side of a host bridge to the PCI devices on the other side of the host bridge. Many modifications may be made to adapt the teachings of the present invention to a particular situation without departing from the scope thereof Therefore, it is intended that the present invention not be limited to the various exemplary embodiments disclosed, but that the present invention includes all embodiments falling within the scope of the appended claims.

What is claimed is:

1. A mechanism, comprising:
   input logic to receive variables of a read command, a bus frequency, and a bus data width signal from a bus device; and
   control logic to generate fetch sizes of data to be fetched from a memory subsystem on one side of a host chipset for the bus device on an opposite side of said host chipset as a function of said read command, said bus frequency, and said bus data width signal,
   wherein the input logic and the control logic are implemented by one of a programmable logic array (PLA) and a look-up table to generate the fetch sizes of data to be fetched from the memory subsystem as the function of said read command, said bus frequency, and said bus data width signal.

2. The mechanism as claimed in claim 1, wherein said fetch sizes of data are fetched from said memory subsystem on one side of said host chipset, via a primary bus, for the bus device on an opposite side of said host chipset, via a secondary bus.

3. The mechanism as claimed in claim 2, wherein said primary bus and said secondary bus correspond to Peripheral Component Interconnect (PCI) buses, and said host chipset corresponds to a PCI-PCI bridge of a computer system.

4. The mechanism as claimed in claim 2, wherein said read command corresponds to one of a memory read command, a memory read line command, and a memory read multiple command for reading different amount of data from said memory subsystem during a read cycle.

5. The mechanism as claimed in claim 2, wherein said bus frequency corresponds to one of 33 MHz and 66 MHz, based upon assertion of 66 MHz__ENABLE pin from said bus device connected to said secondary bus.

6. The mechanism as claimed in claim 2, wherein said bus data width signal corresponds to one of 32 bits and 64 bits, based upon assertion of REQ64# pin from said bus device connected to said secondary bus.

7. The mechanism as claimed in claim 2, wherein said input logic is further coupled to receive information pertaining a cache line size of a computer system for said control logic to generate the fetch values indicating the fetch sizes of data to be fetched from said memory subsystem.

8. A computer system, comprising:

a memory subsystem;

a host chipset connected to said memory subsystem, via a first bus; and a bus device connected to said host chipset, via a second bus;

said host chipset fetching data from said memory subsystem for said bus device upon request, said host chipset comprising:

buffers which store data fetched from said memory subsystem, via said first bus, for said bus device; and a data fetching control mechanism which receives input variables of a read command, a bus frequency, and a bus data width from said bus device, and which generates fetch values indicating fetch sizes of data to be fetched from said memory subsystem on one side of said host chipset, via said first bus, for temporary storage in said buffers for said bus device on an opposite side of said host chipset, via said second bus.

9. The computer system as claimed in claim 8, wherein said data fetching control mechanism corresponds to one of a programmable logic array and a look-up table containing different fetch values indicating different fetch sizes of data to be fetched from said memory subsystem in correspondence with the input variables of said read command, said bus frequency, and said bus data width from said bus device.

10. The computer system as claimed in claim 8, wherein said host chipset corresponds to a Peripheral Component Interconnect (PCI) 64-bit hub.

11. The computer system as claimed in claim 8, wherein said first bus and said second bus correspond to Peripheral Component Interconnect (PCI) buses, and said host chipset corresponds to a PCI-PCI bridge.

12. The computer system as claimed in claim 8, wherein said read command corresponds to one of a memory read command, a memory read line command, and a memory read multiple command for reading different amount of data from said memory subsystem during a read cycle.

13. The computer system as claimed in claim 8, wherein said bus frequency corresponds to one of 33 MHz and 66 MHz, based upon assertion of 66 MHz_ENABLE pin from said bus device connected to said second bus.

14. The computer system as claimed in claim 8, wherein said bus data width corresponds to one of 32 bits and 64 bits, based upon assertion of REQ64# pin from said bus device connected to said second bus.

15. The computer system as claimed in claim 8, wherein said data fetching control mechanism further receives information pertaining a cache line size of the computer system for generating the fetch values indicating the fetch sizes of data to be fetched from said memory subsystem.

16. The computer system as claimed in claim 8, further comprising:

a second chipset connected to said memory subsystem, via said first bus;

a flash memory connected to said second chipset to store an operating system (OS) and a set of system basic input/output start up (BIOS) routines at startup; and a super I/O connected to said second chipset to provide an interface with a group of I/O devices, including a keyboard controller for controlling operations of an alphanumeric keyboard, a cursor control device, a mass storage device, and serial and parallel ports.

17. A method comprising:

receiving input variables of a read command, a bus frequency, and a bus data width from a bus device, via a first bus; and generating fetch values, from one of a programmable logic array and a look-up table, indicating fetch sizes of data to be fetched from a memory subsystem of a computer system on one side of a host chipset, via said first bus, for said bus device on the opposite side of said host chipset, via a second bus, in correspondence with the input variables of said read command, said bus frequency, and said bus data width from said bus device.

18. The method as claimed in claim 17, wherein said first bus and said second bus correspond to Peripheral Component Interconnect (PCI) buses, and said host chipset corresponds to a PCI-PCI bridge.

19. The method as claimed in claim 17, wherein said read command corresponds to one of a memory read command, a memory read line command, and a memory read multiple command for reading different amount of data from said memory subsystem during a read cycle.

20. The method as claimed in claim 17, wherein said bus frequency corresponds to one of 33 MHz and 66 MHz, based upon assertion of 66 MHz_ENABLE pin from said bus device connected to said second bus.

21. The method as claimed in claim 17, wherein said bus data width corresponds to one of 32 bits and 64 bits, based upon assertion of REQ64# pin from said bus device connected to said second bus.

22. The method as claimed in claim 17, further comprising:

receiving information pertaining a cache line size of the computer system; and generating said fetch values indicating the fetch sizes of data to be fetched from said memory subsystem in correspondence with the input varables of said read command, said bus frequency, said bus data width and said cache fine size from said bus device.

23. A computer system, comprising:

a memory;

a host chipset coupled to said memory, via a first bus; and a bus device coupled to said host chipset, via a second bus;

the host chipset fetching data from the memory for the bus device upon request, the host chipset comprising:

buffers to store data fetched from the memory, via the first bus, for the bus device; and a look-up table to receive input variables of a read command, a bus frequency, and a bus data width from the bus device, and to produce fetch values indicating fetch sizes of data to be fetched from the memory on one side of the host chipset, via the first bus, for temporary storage in the buffers for the bus device on an opposite side of the host chipset, via the second bus.

24. The computer system as claimed in claim 23, wherein the look-up table contains fetch values indicating different fetch sizes of data to be fetched from the memory in accordance with the input variables of the read command, the bus frequency, and the bus data width from the bus device.

25. The computer system as claimed in claim 23, wherein the look-up table further receives information pertaining a cache line size of the computer system and produces the fetch values indicating the fetch sizes of data to be fetched from the memory in accordance with the input variables of the read command, the bus frequency, the bus data width and the cache line size from the bus device.

26. The computer system as claimed in claim 23, wherein the host chipset corresponds to a Peripheral Component Interconnect (PCI) 64-bit hub, the first bus and the second bus correspond to Peripheral Component Interconnect (PCI) buses, and the host chipset corresponds to a PCI-PCI bridge.

27. The computer system as claimed in claim 23, wherein the read command corresponds to one of a memory read command, a memory read line command, and a memory read multiple command for reading different amount of data from the memory during a read cycle.

28. The computer system as claimed in claim 27, wherein the bus frequency corresponds to one of 33 MHz and 66 MHz, based upon assertion of 66 MHz_ENABLE pin from the bus device connected to the second bus.

29. The computer system as claimed in claim 28, wherein the bus data width corresponds to one of 32 bits and 64 bits, based upon assertion of REQ64# pin from the bus device coupled to the second bus.

30. The computer system as claimed in claim 29, wherein the look-up table further receives information pertaining a cache line size of the computer system and produces the fetch values indicating the fetch sizes of data to be fetched from the memory in accordance with the input variables of the read command, the bus frequency, the bus data width and the cache line size from the bus device.

* * * * *